United States Patent
Gordon et al.

(10) Patent No.: US 9,617,758 B2
(45) Date of Patent: Apr. 11, 2017

(54) ADJUSTABLE OR SWIVELABLE SETUP FOR SECURING ELECTRONIC EQUIPMENT

(71) Applicants: Saul Ilan Gordon, San Bernardino, CA (US); Kimbre Dale Sargent, San Bernardino, CA (US)

(72) Inventors: Saul Ilan Gordon, San Bernardino, CA (US); Kimbre Dale Sargent, San Bernardino, CA (US)

( * ) Notice: Subject to any disclaimer, the term of this patent is extended or adjusted under 35 U.S.C. 154(b) by 0 days.

(21) Appl. No.: 14/863,453

(22) Filed: Sep. 24, 2015

(65) Prior Publication Data

US 2016/0011634 A1    Jan. 14, 2016

Related U.S. Application Data

(63) Continuation-in-part of application No. 13/473,896, filed on May 17, 2012, now Pat. No. 9,151,083.

(60) Provisional application No. 61/487,680, filed on May 18, 2011.

(51) Int. Cl.
  *E05B 73/00* (2006.01)
  *E05B 17/22* (2006.01)
  *E05B 65/00* (2006.01)
  *E05B 67/38* (2006.01)

(52) U.S. Cl.
  CPC ........ *E05B 73/0082* (2013.01); *E05B 17/226* (2013.01); *E05B 65/00* (2013.01); *E05B 73/00* (2013.01); *E05B 67/383* (2013.01)

(58) Field of Classification Search
  CPC ........ E05B 65/00; E05B 73/00; E05B 17/226; E05B 73/0082

USPC ......... 248/551, 552, 553, 917, 246.1, 282.1, 248/289.11, 125.7, 145; 361/679.57, 726
See application file for complete search history.

(56) References Cited

U.S. PATENT DOCUMENTS

| | | | | |
|---|---|---|---|---|
| 3,945,227 A | * | 3/1976 | Reiland | B60R 11/02 70/58 |
| 4,138,806 A | * | 2/1979 | Miller | E04B 1/34347 52/149 |
| 4,585,202 A | * | 4/1986 | Parsekian | F16M 13/00 248/500 |
| 5,076,531 A | * | 12/1991 | Delaney | B60R 11/06 211/4 |
| 5,281,001 A | * | 1/1994 | Bergsten | A47B 21/0371 248/118 |

(Continued)

FOREIGN PATENT DOCUMENTS

| | | | | |
|---|---|---|---|---|
| FR | 2431941 A1 | * | 2/1980 | ......... B60R 11/0205 |
| FR | 2680407 A1 | * | 2/1993 | ......... E05B 73/0082 |
| GB | 2273126 A | * | 6/1994 | ......... E05B 73/0082 |

*Primary Examiner* — Eret McNichols
(74) *Attorney, Agent, or Firm* — Louis Wu

(57) ABSTRACT

An adjustable or swivelable setup for securing electronic equipment is provided. The setup includes an apparatus for securing electronic equipment to a substantially horizontal surface of a support structure. The apparatus includes a fastening means such as an adjustable collar, a mounting bracket for attachment to the support structure, and a connector. The connector is interposed between and attached to the collar and mounting bracket. The connector may swivel about an axis perpendicular to the horizontal surface. The apparatus is particularly suited for use with equipment having an electronic component attached to a neck extending from a base.

20 Claims, 11 Drawing Sheets

(56) References Cited

U.S. PATENT DOCUMENTS

| | | | | |
|---|---|---|---|---|
| 5,429,336 A | * | 7/1995 | Ko | F16M 11/04 248/278.1 |
| 5,816,076 A | * | 10/1998 | Biedermann | E05B 73/0082 248/552 |
| 6,012,739 A | * | 1/2000 | Weiss | A63C 11/025 280/814 |
| 6,070,843 A | * | 6/2000 | Rosen | B64D 11/0015 248/222.11 |
| 6,082,697 A | * | 7/2000 | Grunfeld | A63B 63/004 248/156 |
| 6,178,089 B1 | * | 1/2001 | Alfonso | E05B 73/0005 361/727 |
| 6,216,499 B1 | * | 4/2001 | Ronberg | E05B 73/0082 248/551 |
| 6,308,928 B1 | * | 10/2001 | Galant | E05B 73/0082 248/553 |
| 6,443,417 B2 | * | 9/2002 | Galant | E05B 73/0082 248/553 |
| 6,470,718 B1 | * | 10/2002 | Yang | E05B 67/003 70/25 |
| 6,478,275 B1 | * | 11/2002 | Huang | F16M 11/04 248/278.1 |
| 6,590,767 B2 | * | 7/2003 | Liao | F16M 13/02 248/917 |
| 6,763,690 B2 | * | 7/2004 | Galant | E05B 73/0082 248/553 |
| 6,854,222 B2 | * | 2/2005 | Hansort | E04G 21/26 248/354.3 |
| 6,857,610 B1 | * | 2/2005 | Conner | F16M 11/04 248/284.1 |
| 6,957,515 B1 | * | 10/2005 | Hatfield | E04F 21/18 248/354.3 |
| 7,104,093 B2 | * | 9/2006 | Ling | E05B 71/00 70/25 |
| 7,174,752 B2 | * | 2/2007 | Galant | E05B 73/0082 248/553 |
| 7,207,537 B2 | * | 4/2007 | Hung | F16M 11/04 248/274.1 |
| 7,243,892 B2 | * | 7/2007 | Pfister | F16M 11/04 248/281.11 |
| D559,076 S | * | 1/2008 | Allen | D8/330 |
| 7,324,333 B2 | * | 1/2008 | Allen | E05B 73/0082 211/8 |
| 7,364,127 B2 | * | 4/2008 | Huang | F16M 11/04 248/276.1 |
| 7,464,909 B2 | * | 12/2008 | Li | F16M 11/04 248/274.1 |
| 7,487,652 B2 | * | 2/2009 | Marszalek | E05B 73/0005 248/553 |
| 7,565,824 B1 | * | 7/2009 | Gleason | E05B 73/0005 248/552 |
| 7,611,118 B2 | * | 11/2009 | O'Neill | E05B 73/0082 248/551 |
| 7,658,363 B2 | * | 2/2010 | Meyer | E05B 73/0082 248/551 |
| D630,623 S | * | 1/2011 | Molter | D14/239 |
| 7,918,427 B2 | * | 4/2011 | Wang | F16M 13/00 248/278.1 |
| 7,922,137 B2 | * | 4/2011 | Derry | A47B 21/0314 248/178.1 |
| 8,061,164 B2 | * | 11/2011 | Johnston | E05B 73/0082 248/553 |
| 8,087,624 B2 | * | 1/2012 | Varney | F16M 11/10 248/125.8 |
| 8,500,077 B2 | * | 8/2013 | Smed | A47B 21/0314 108/140 |
| 8,578,743 B2 | * | 11/2013 | Yu | E05B 37/025 70/30 |
| 8,602,367 B2 | * | 12/2013 | Wang | F16M 11/046 211/206 |
| 8,720,848 B2 | * | 5/2014 | Tan | E05B 73/0082 248/346.01 |
| 8,882,069 B2 | * | 11/2014 | Mahaffey | E05B 73/0005 248/310 |
| 9,032,766 B2 | * | 5/2015 | Su | E05B 73/0082 70/14 |
| 9,234,372 B2 | * | 1/2016 | Weber | B60R 11/02 |
| 2003/0075653 A1 | * | 4/2003 | Li | F16M 11/04 248/274.1 |
| 2003/0164010 A1 | * | 9/2003 | Galant | E05B 73/0082 70/58 |
| 2004/0035157 A1 | * | 2/2004 | Petrick | E05B 73/0082 70/58 |
| 2004/0261474 A1 | * | 12/2004 | Galant | E05B 73/0082 70/58 |
| 2006/0284031 A1 | * | 12/2006 | Whalen | A47B 81/061 248/125.8 |
| 2008/0104716 A1 | * | 5/2008 | Hall | E05B 73/0082 726/34 |
| 2009/0173848 A1 | * | 7/2009 | Green | F16M 11/10 248/125.8 |
| 2010/0101284 A1 | * | 4/2010 | Varney | F16M 11/10 70/57 |
| 2010/0123061 A1 | * | 5/2010 | Vlies | F16M 11/10 248/220.1 |
| 2011/0100073 A1 | * | 5/2011 | Johnston | E05B 73/0082 70/57.1 |
| 2011/0170257 A1 | * | 7/2011 | Allen | E05B 73/0082 361/679.57 |
| 2011/0174024 A1 | * | 7/2011 | Yu | E05B 37/025 70/58 |
| 2012/0006084 A1 | * | 1/2012 | Weber | E05B 67/383 70/466 |
| 2012/0307448 A1 | * | 12/2012 | Allen | E05B 73/0082 361/679.57 |
| 2013/0206942 A1 | * | 8/2013 | Trotsky | F16M 11/041 248/274.1 |
| 2014/0071619 A1 | * | 3/2014 | Yang | G06F 21/88 361/679.57 |
| 2014/0238091 A1 | * | 8/2014 | Allen | E05B 73/0082 70/58 |

* cited by examiner

ADJUSTABLE OR SWIVELABLE SETUP FOR SECURING ELECTRONIC EQUIPMENT

CROSS REFERENCE TO RELATED APPLICATIONS

This application is a continuation-in-part of U.S. patent application Ser. No. 13/473,896, entitled "APPARATUS AND SETUP FOR SECURING ELECTRONIC EQUIPMENT," filed on May 17, 2012, by inventors Saul Ilan Gordon and Kimbre Dale Sargent, now issued as U.S. Pat. No. 9,151,083 to Gordon et al., which claims priority to U.S. Provisional Patent Application Ser. No. 61/487,680, entitled "APPARATUS AND SETUP FOR SECURING ELECTRONIC EQUIPMENT," filed on May 18, 2011, by inventors Saul Ilan Gordon and Kimbre Dale Sargent, the disclosures of which are incorporated by reference in its entirety.

BACKGROUND

The invention generally relates to apparatuses and setups for securing electronic equipment to a substantially horizontal surface of a support structure. More particularly, the invention relates to apparatuses and setups for use with electronic equipment that includes, for example, an electronic component attached to a neck extending from a base located on the substantially horizontal support structure surface.

Thefts from schools, offices, businesses, retail stores, boats, and any other place that uses, displays, stores, or warehouses various types and sizes of electronic equipment have become commonplace. The value of home-based and work-based electronic devices and equipment can be quite substantial, making such components and devices good candidates for being stolen. Even smaller, common, less sophisticated electronic items can sell anywhere from several hundred dollars to several thousands of dollars. In addition, electronic items being manufactured today have physical size and weight characteristics that allow these items to be easily transported, making them ideal targets for crime.

A number of anti-theft devices are commercially available. For example, a number of vendors sell anti-theft devices that include a flexible cable for securing electronic equipment to support structures such as desks or carts. Such cable-type anti-theft devices may be adapted for use with different types of electronic equipment, e.g., display monitors, desktop and laptop computers, etc.

Cable-type anti-theft devices suffer from a number of disadvantages. Although such devices may deter the unsophisticated thief, they may not deter seasoned experts. The small diameter of the cables and the superficial means of attaching them to the electronic equipment render the anti-theft device easily removable without damaging the usefulness of the equipment. For example, a simple cable cutter may be used to sever the cables securing the electronic equipment. In addition, cable-type devices sometimes require the presence of a Kensington slot (K-slot). Not all electronic equipment have K-slots. Furthermore, such devices may be obtrusive to the desired operation or appearance of the electronic equipment. Cables may, for example, be attached in a manner that may render them dangling in an inconvenient position and/or susceptible to entanglement with electrical cords and/or wires associated with the electronic equipment secured by the cables. In turn, trip or other safety hazards may result.

Antitheft devices have been constructed for particular types of electronic equipment. For example, tower computers (also known as computer tower, CPU or CPU tower) may be secured in lockable enclosures. Such enclosures typically comprise an external locking means, e.g., located on the front of the cabinet in which such computers are stored. As another example, U.S. Pat. No. 6,418,014 to Emerick, Jr. describes an anti-theft system for protecting an electronic device. The system includes a housing having a locking passage formed therein and a constraining device positioned in and extending through the locking passage. The constraining device may be an elongated bar, flexible cable or chain. Any attempt at forced removal of the constraining device will result in destruction of the internal components of the electronic device and the housing, thereby rendering the electronic device worthless.

Anti-theft devices may be constructed for use with laptop computers as well. For example, U.S. Pat. No. 7,724,520 to Allen describes a locking assembly for a notebook/laptop computer or other personal electronic device. The locking assembly includes a locking base secured to a working surface. The locking base locks the notebook computer or other personal electronic device securely in place to a work surface such as a desktop or tabletop. The lock is adapted to engage the notebook computer or other personal electronic device's screen in an open position, leaving a front surface of the screen viewable. The lock includes a locking member, which prevents removal of the notebook computer or other personal electronic device from the work surface.

Recently, electronic equipment such as those employing flat panel displays has gained in popularity. Designers have sought to exploit the sleek and clean appearance of such equipment to enhance the décor of their surroundings. Bulky and/or poorly designed antitheft devices often do not fit within such design schemes.

Accordingly, opportunities exist to overcome disadvantages associated with known technologies for securing electronic equipment and to provide security solutions associated with the above-described and other types of equipment, electronic or otherwise.

SUMMARY

In general, the invention relates to an apparatus for securing equipment to a substantially horizontal surface of a support structure. The apparatus includes a fastening means such as an adjustable collar, a mounting bracket for attachment to the support structure or other item, e.g., a wall adjacent to the structure, and a connector. The connector is interposed between and attached to the collar and mounting bracket. Optionally, the connector may have a surface that substantially conforms to the horizontal surface of the support structure when the mounting bracket is attached to the support structure. Further optionally, the connector may be attached to the mounting bracket in a manner that allows the connector to swivel along the horizontal surface about an axis perpendicular thereto.

Although the invention may be used to secure any of a number of different types of equipment, the invention is typically used with electronic equipment. For example, the invention may be used with equipment having an electronic component attached to a neck extending from a base, the neck and base optionally representing portions of a unitary component of the electronic equipment. In such a case, the fastening means may include a collar for fastening around the neck of the electronic equipment. The collar may be attached to the connector in a manner that allows the electronic equipment to swivel, e.g., about a vertical axis, relative to the horizontal support structure. Optionally, the fastening means may be detachable from the connector.

Any of a number of different locking means may be used. For example, a removable lock may be used when the collar and the connector have corresponding openings through which the lock is inserted. Nonremovable or integrated locks may be used as well.

How the mounting bracket and the connector physically relate to each other may vary as well. For example, the connector may be attached to the mounting bracket in a hinged or ball-and-joint manner. When the connector defines a connector axis, the mounting bracket may be hinged to the connector in a manner that allows the bracket to rotate about a hinge rotation axis that is perpendicular to the connector axis. Optionally, a means may be provided for immobilizing the connector relative to the mounting bracket. Such means may serve to attach the connector to the horizontal surface of the support structure or be an integral component of the connector and the mounting bracket.

The invention may serve additional functions as well. For example, a means may be provided for managing wire extending from the electronic equipment. Such wire-managing means may be attached, e.g., directly or indirectly, to the connector.

In another embodiment, an electronic equipment setup is provided that includes a support structure having a substantially horizontal surface and electronic equipment as described above on the substantially horizontal surface of the support structure. A securing apparatus as described above is provided. The securing means is fastened to the electronic equipment, and the mounting bracket attached to the support structure.

When a collar is secured about a neck of the electronic equipment, the collar should be constructed in a manner that does not allow it to be easily slipped off the equipment's neck. In some instances, the collar may have a rigid construction. In addition or in the alternative, the collar may have a minimum inner circumference that is equal to or greater than a maximum outer circumference of the neck by no more than an appropriate amount, e.g., about 10% or 20%.

The mounting bracket may be attached directly to a substantially vertical surface rather than the substantially horizontal surface of the support structure. When the electronic equipment includes an output device such as a display, the output device may face away from the securing apparatus. Optionally, the output device further comprises and/or interfaces with an input device.

BRIEF DESCRIPTION OF THE DRAWINGS

The present invention can best be understood in connection with the accompanying drawings. The invention is not limited to the precise embodiments shown in drawings, which include:

FIG. 2A shows the setup in cross-sectional view. FIG. 2B shows the setup in front view with the invention attached from the rear.

FIG. 3A shows an assembled securing apparatus comprising a collar attached via a padlock and a connector to a mounting bracket. FIG. 3B shows the collar depicted in FIG. 3A in an open configuration. FIGS. 3C and 3D show how the mounting bracket of the apparatus may swivel about a hinge bearing.

FIG. 4A shows the computer in front view. FIG. 4B shows the computer in side view. FIG. 4C shows the computer in back view.

FIG. 6A is a photograph of a top mounted, non-telescoping, non-swiveling space-saver unit. FIG. 6B is a close up photograph of a swiveling component of a top mounted unit.

DETAILED DESCRIPTION OF THE INVENTION

Definitions and Overview

Figure 1:
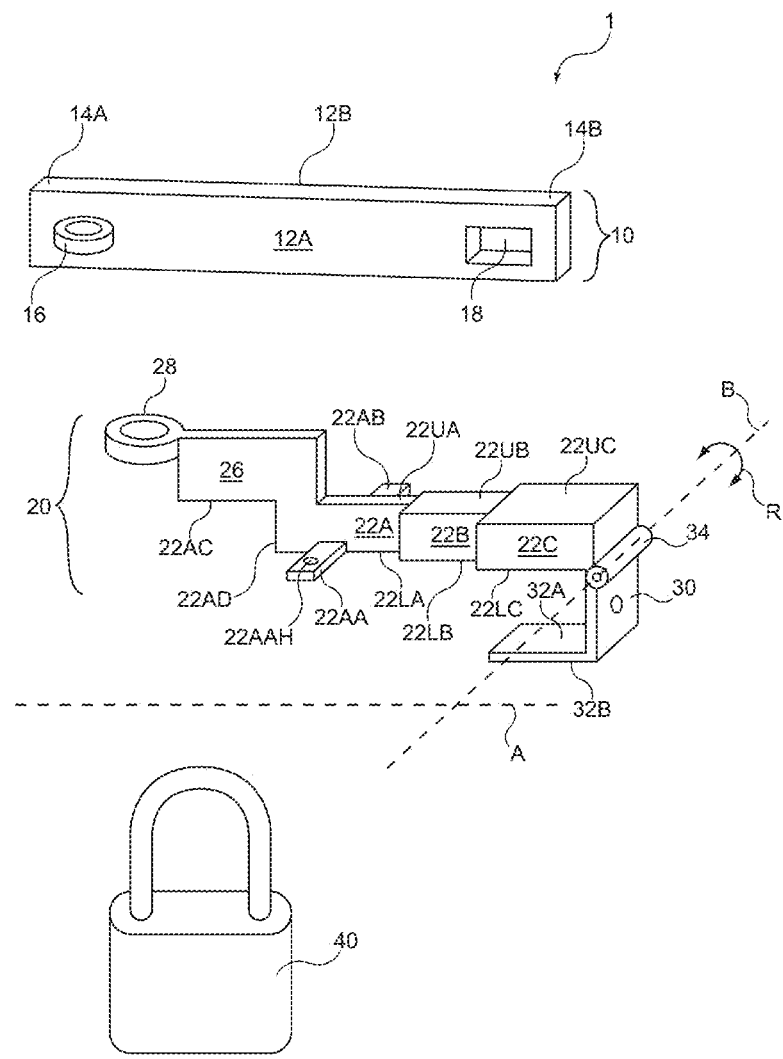
FIG. 1 schematically depicts an exemplary securing apparatus of the invention in a disassembled form.

Before describing the present invention in detail, it is to be understood that the invention is not limited to specific brands or types of electronic equipment, as such may vary. It is also to be understood that the terminology used herein is for describing particular embodiments only, and is not intended to be limiting.

In addition, as used in this specification and the appended claims, the singular article forms "a," "an," and "the" include both singular and plural referents unless the context of their usage clearly dictates otherwise. Thus, for example, reference to "an apparatus" includes a single apparatus as well as an assembly of apparatuses, reference to "a collar" includes a plurality of collars as well as a single collar, and reference to "a neck" includes a single neck as well as a combination of necks, and the like.

In this specification and in the claims that follow, reference will be made to a number of terms that shall be defined to have the following meanings, unless the context in which they are employed clearly indicates otherwise:

The term "attach" and its variants, e.g., "attached," "attachment," and "attaching," are used herein in their ordinary sense and may be synonymously used to mean "join," "fasten," "connect," "affix," and/or the like. Unless specified with particularity, the term "attach" when applied to two items, e.g., a collar and a mounting bracket, does not necessarily mean that the items are attached directly to each other. The items may instead be indirectly attached to each other via an intermediary, e.g., a connector.

The term "bracket" as in "mounting bracket" is used in its ordinary sense and refers to a typically simple and rigid structure that may serve to immobilize, anchor, affix, and/or support a first item relative to a second item.

The term "collar" is used in its ordinary sense and refers to a partially or fully encircling structure, e.g., that encircles a neck of electronic equipment.

The term "connector" is used in its ordinary sense and refers to an item that connects other items. For example, a connector may be attached, directly or indirectly, to a collar and a mounting bracket to form an apparatus for securing electronic equipment.

The term "conform" is used in its ordinary sense and refers to acting in accordance or harmony. For example, when one rigid surface conforms to another, the surfaces may be parallel to each other. Optionally, the surfaces may be in contact with each other over a relatively large region instead of at a single point.

The terms "electronic," "electronically," and the like are used in their ordinary sense and relate to structures, e.g., semiconductor microstructures, that provide controlled conduction of electrons or other charge carriers, e.g., holes. Similarly, the term "equipment" is used in its ordinary sense and refers to anything kept, furnished, or provided for a specific purpose. For example, the term "electronic display equipment" may refer to hardware and software that involves controlled conduction of electrons in a silicon chip in a digital and/or analog manner to show or bring images to the attention of one or more viewers.

The terms "hinge" and "hinged" are used herein in their ordinary sense and refers to a jointed or flexible device that allows the relative turning or pivoting motion of a plurality of different parts.

The term "internet" is used herein in its ordinary sense and refers to an interconnected system of networks that connect computers around the world via the TCP/IP and/or other protocols. Unless the context of its usage clearly indicates otherwise, the term "web" is generally used in a synonymous manner with the term "internet." The term "internet" calls forth all equipment associated therewith, e.g., microelectronic processors, memory modules, storage media such as disk drives, tape backup, and magnetic and optical media, modems, routers, etc.

The term "neck" is used herein in its ordinary sense (e.g., the neck of a wine glass is the slim part of the glass that connects the base to the glass' bowl) and refers to a typically narrow part of an item that connects two other typically wider parts of the item.

"Optional" or "optionally" means that the subsequently described circumstance may or may not occur, so that the description includes instances where the circumstance occurs and instances where it does not.

The terms "substantial" and "substantially" are referred to herein in their ordinary sense and are used to describe matters that are, e.g., considerable in importance, value, degree, amount, and/or extent. For example, a "substantially horizontal surface" may be a flat and/or level surface that is oriented at an approximately or precisely right angle to a vertical axis. Other uses of the term "substantially" involve an analogous definition.

The term "support structure" is used in its ordinary sense and refers to anything that can be built, arranged or assembled to have a surface on which electronic equipment may be placed. Exemplary support structures include desks, tables, cabinets, carts, platforms, shelves, etc.

Unless the context of the term's usage clearly indicates otherwise, the term "support structure" is generally to be interpreted broadly and may encompass an assembly or collection of items that may not necessarily be attached to each other. For example, a desk and an unattached hutch thereon may together be considered a single support structure, even though the desk and the hutch by themselves may also be considered individual support structures. Similarly, a cart may be placed adjacent but unattached to a wall of any orientation, e.g., a cubical wall that may be vertical or slanted. In such a case, the cart in combination with the wall may be considered a single support structure, even though the cart may be easily wheeled away from the wall.

In general, the invention pertains to an apparatus for securing electronic equipment to a substantially horizontal surface of a support structure. The apparatus includes an optional adjustable fastening means, e.g., a collar, connected via a connector to a mounting bracket for attachment to the support structure. Optionally, the connector may have a telescoping construction and/or have a surface that substantially conforms to the horizontal surface of the support structure when the mounting bracket is attached to the support structure.

The invention may be used with different types of equipment, electronic or otherwise. For instance, the invention may be used with equipment having a construction that includes an electronic component attached to a neck extending from a base. Examples of electronic equipment having such a construction include flat screen displays and all-in-one desktop computers, e.g., iMac® computers from Apple, Inc. (Cupertino, Calif.). In such a case, the fastening means may include a collar for fastening around the neck of the electronic equipment. As discussed below, the collar may be attached to the connector in a manner that allows the electronic equipment to swivel relative to the horizontal support structure. Optionally, the fastening means may be detachable from the connector.

The invention allows for facile and relatively unobtrusive implementation of anti-theft technology. In operation, electronic equipment as described above is provided on a substantially horizontal surface of the support structure. A securing apparatus as described above is provided. The securing means is fastened to the electronic equipment, and the mounting bracket attached to the support structure. When a collar is secured about a neck of the electronic equipment, the collar may have an inner circumference that is equal to or greater than the outer circumference of the neck by no more than about 20%, or preferably no more than about 10%. Typically but not necessarily, the security apparatus is located behind the output device. As discussed below, such close fitting collars and the operational positioning of the security device tend to make it more difficult for thieves to use severing tools such as cable and bolt cutters.

As a related matter, components of the inventive apparatus should generally be constructed to deter thieves from cutting or otherwise forcibly damaging components thereof in an attempt to disable the apparatus. Accordingly, the components may be formed from high strength materials. For example, components of the inventive apparatus may include steel, aluminum, alloys thereof, or other metallic components such as vinyl covered cables, flexible tubing covered chains, heavy gauge sheets, tamper-resistant screws, etc.

FIG. 1 shows an exemplary apparatus of the invention in a disassembled form. As is the case with all figures referenced herein, in which like parts are referenced by like numerals, FIG. 1 is not necessarily to scale, and certain dimensions may be exaggerated for clarity of presentation. Not all reference numbers are contained in all drawings. The apparatus 1 includes a collar 10 that generally takes the form of a flexible elongated strap. As shown, the strap has a first major surface 12A that is substantially parallel to a second major surface 12B. When rendered flat, both surfaces 12A and 12B are substantially rectangular in shape. First and second ends of the strap, indicated at 14A and 14B, respectively, are located at the shorter sides of the rectangle. A strap loop 16 is provided at the first end 14A extending in a generally perpendicular direction from the exterior surface 12A of the strap 10. A strap opening 18 is provided extending through both major surfaces 12A and 12B near the second end 14B of the strap 10. The strap opening 18 has a cross-sectional area that corresponds to the length and thickness of strap loop 16. The strap opening is sized to allow the strap loop to be inserted through the strap opening in a manner similar to how a button may be inserted through a buttonhole to close the collar 10. In other words, strap loop 16 and opening 18 work in concert to allow the strap 10 to be secured about a neck of electronic equipment. Alternatively (not shown), a plurality of strap openings may extend through both major strap surfaces along the length of the strap to render the collar adjustable in circumference. As discussed below, adjustable collars may be rendered more or less conforming to the circumference of the equipment's neck.

The apparatus 1 also includes a connector 20 that includes distal segment 22A nesting within middle segment 22B which in turn nests within proximal segment 22C. As shown in FIG. 1, the nesting segments 22A, 22B and 22C collectively form a connector body 22 capable of telescoping action along axis A. Distal segment 22A additionally includes side flange 22AA having opening 22AAH extending therethrough. Side flange 22AB having an opening (not shown) extending therethrough also protrudes from distal segment. The nesting segments 22 have lower surfaces indicated at 22LA, 22LB, and 22LC, that are generally coplanar to each other. As a result, the nesting segments' lower surfaces, collectively referred to as lower surface 22L, may therefore, as discussed below, conform to a substantially planar surface. Nesting segments 22 also have upper surfaces 22UA, 22UB, and 22UC, collectively referred to as upper surface 22U. L-shaped hitch 26 is depicted as extending in a cantilevered manner relative to undersurfaces 22AC and 22AD of segment 22A. Hitch 26 terminates in a loop 28 of identical or similar dimensions to loop 16 of collar 10.

A mounting bracket 30 is provided comprising a bent member having opposing interior and exterior surfaces, indicated at 32A and 32B, respectively. One or more holes extend through the bracket 30. The bracket is attached via a hinge bearing 34 to proximal segment 22C of the connector 20. The hinge bearing 34 defines a rotational axis B about which the bracket 30 may rotate, as indicated by arrows R, relative to the connector 20.

Optionally, a lock 40 may be provided. Any of a number of locks may be used. In some instances, the lock may be an integrated component of the securing apparatus 1. In the alternative, as shown in FIG. 1, a removable lock may be used. In any case, any mechanical or electromechanical fastening device that is released by a physical object, e.g., a key, keycard, fingerprint, RFID card, security token or by secret information, e.g., keycode or password), or combination of both.

Figure 2A:
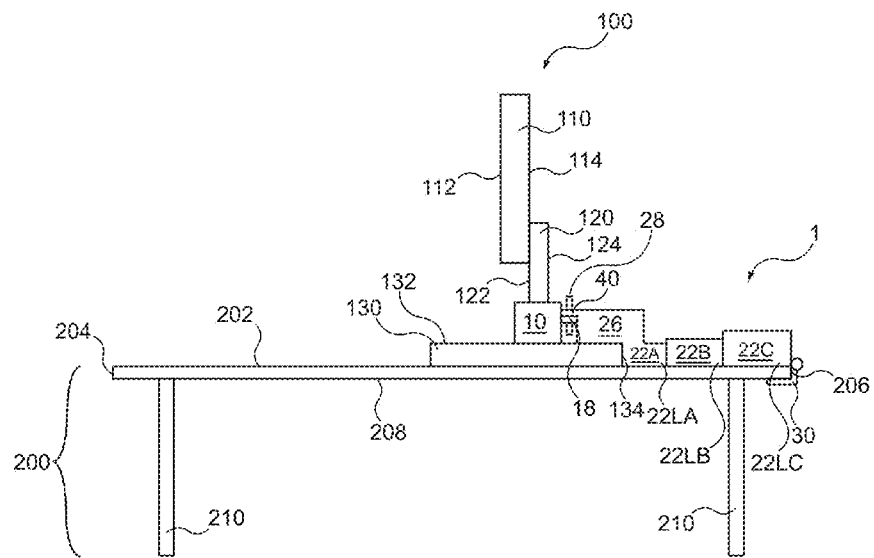
FIGS. 2A and 2B, collectively referred to as FIG. 2, schematically depict an electronic equipment setup that uses the securing apparatus of FIG. 1.
Figure 2B:
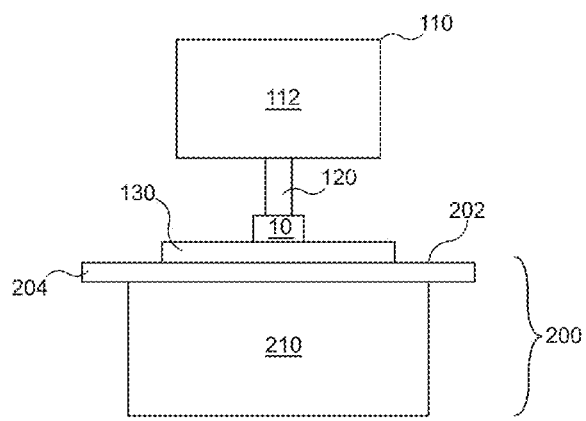

FIG. 2 depicts an inventive electronic equipment setup that uses the securing apparatus 1 shown in FIG. 1 to secure electronic equipment to a support structure. As shown, electronic equipment 100 is provided in the form of a flat panel display that includes an electronic component 110 in the form of a pixelated output display screen having a front surface 112 and back panel 114. The width and depth of the display screen 110 define a rectangular perimeter and an associated screen circumference. Attached to the back panel 114 is a neck 120. While the neck may have any of a number of different geometries, the neck 120 shown in FIG. 2 has parallel planar front and rear surfaces, indicated at 122 and 124, respectively, that together with the side surfaces of the neck define a rectangular perimeter and an associated neck circumference. The base 130 is provided in the shape of a rectangular block having an upper major surface 132 from which the neck 120 extends and a substantially vertical rear base surface 134 that intersects with the upper major surface 132. The rear base surface 134 and other peripheral surfaces of the base define a base perimeter and an associated base circumference. As shown, the neck 120 has a circumference that is substantially smaller than the circumference either of the screen 110 or of the base 130.

In operation, a support structure 200 may be provided. As shown in FIG. 2, the support structure 200 may take the form of a table having a horizontal tabletop with a substantially planar upper surface 202 on which the electronic equipment 100 may be placed. The table additionally includes a vertical front and rear surface, indicated at 204 and 206, respectively, and a lower surface 208 from which legs 210 extend downward. The flat panel display 100 is placed on the table 200 such that its front surface 112 is substantially parallel to the front surface 204 and faces away from the vertical support surface 206. Typically, the horizontal surface 202 is of sufficient area to ensure that no portion of the base 130 will hang over any edge of the surface 202. In addition, the flat panel display's base 130 should be located at a distance from the rear table surface 206 that may be spanned by telescoping connector 20. For example, the telescoping connector may exhibit a variable length ranging from about 5 cm to about 60 cm. More typically, the telescoping connector may exhibit a length ranging from about 10 cm to about 40 cm.

The apparatus 1 may then be used to secure the electronic equipment 100 to the support structure 200. As shown in FIG. 2, apparatus 1 is placed on the platform 200 so that the lower connector surface 22 may conform to the platform's horizontal surface 202. Also as shown, hinge bearing 34 may be placed in an overhanging manner relative to a rear edge of the platform's horizontal surface 202. The mounting bracket 30 may be positioned such that interior surface 32A of the mounting bracket 30 faces the rear surface 206 and the lower surface 208 of the table 200. The mounting bracket 30 may then be screwed, bolted, or otherwise affixed in a substantially permanent manner, e.g., using tamper-resistant or ordinary screws, to the rear surface 206 and/or lower surface 208 of the table 200. Affixing the mounting bracket 30 to surfaces other than the surface 202 may render the inventive apparatus less easily removable than if the apparatus were attached only to surface 202.

To secure the flat panel display 100, the collar 10 may be wrapped about the display's neck 120 with the interior surface 12B facing the neck 120. The second end 14B of the collar 10 is placed in an overlapping manner such that loop 16 extends through strap opening 18. If needed, the collar 10 is then rotated such that loop 16 extends perpendicularly away from the neck's rear surface 124.

Typically, the collar 10 should be wrapped about the neck 120 in a relatively tight manner for a number of reasons. At a minimum, the inner circumference of the collar may be less than the circumference of either the screen 110 or the base 130 to prevent the collar from being slid off the display 100 or the base 130. In addition, a tight fit may render the collar less susceptible to potential damage from cutting tools such as shears. Optionally, the collar may have an inner circumference no greater than the outer circumference of the neck by about 20%, more preferably by about 10%.

Once the collar is in place, the loop 16 may be aligned with hitch loop 28. This involves adjusting the overall length of the connector body 22 such that the lower surface 22L of connector body 22 is placed in conformal contact with the horizontal surface 202 of the table 200. In addition, undersurfaces 22AC and 22AD of segment 22A may also conform to base surfaces 132 and 134. Such conformal contact also renders the connector body more difficult to cut. Once in place, the connector body 22 may be screwed, bolted, or otherwise permanently affixed to the upper surface 202 of the table 200 via the openings that extend through flanges 22AA and 22AB, respectively. As a result, the connector body 22 is immobilized relative to the mounting bracket.

In any case, a lock 40 is then used to lock together collar loop 16 with the hitch loop 28. As shown, a padlock may be used. As a result, the flat panel display 100 is secured to the table 200 in a manner that allows the display to swivel for viewing from different angles or by different people. Moreover, the apparatus is unobtrusive in both appearance and functionality. As shown in in FIG. 2B, casual users of the electronic equipment setup may notice only the collar 10 of the inventive apparatus.

Figure 3A:
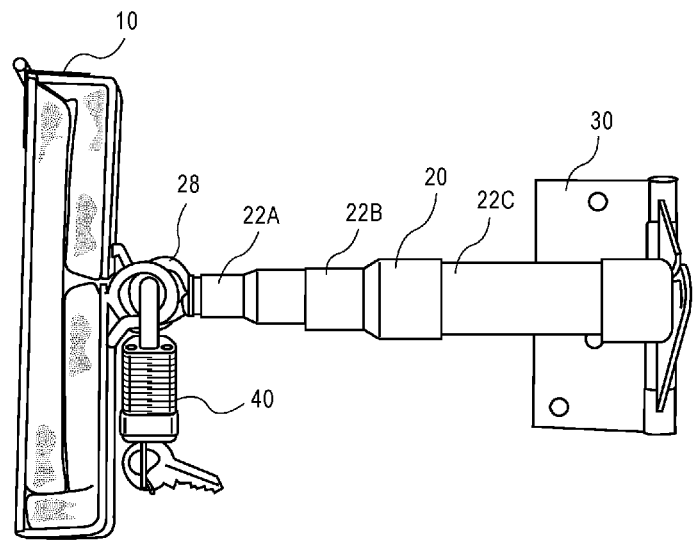
FIGS. 3A-3D, collectively referred to as FIG. 3, are photographs of a prototype securing apparatus specifically constructed for securing an iMac® computer.
Figure 3B:
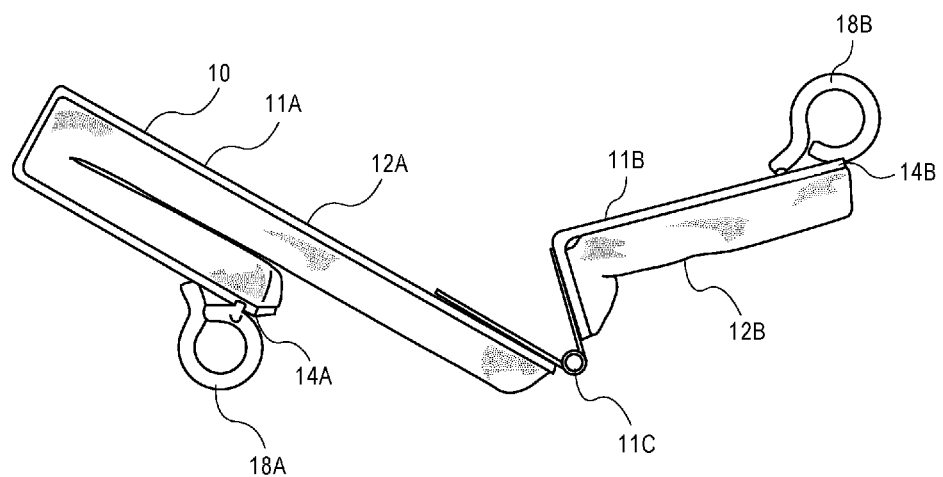
Figure 3C:
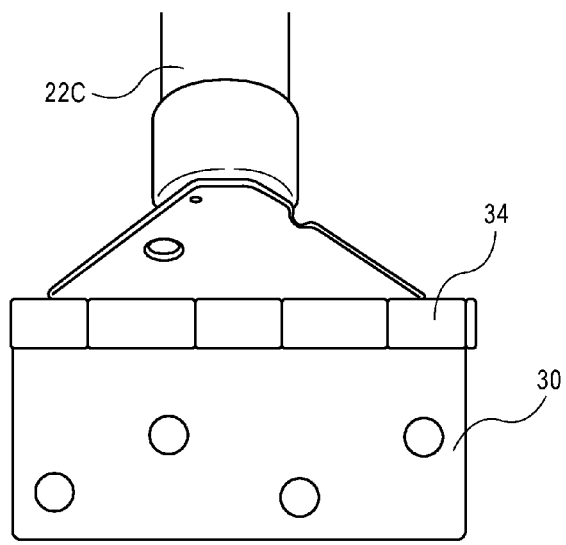
Figure 3D:
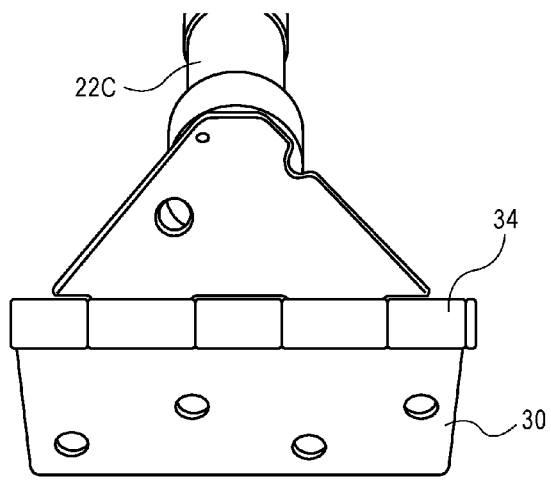
Figure 4A:
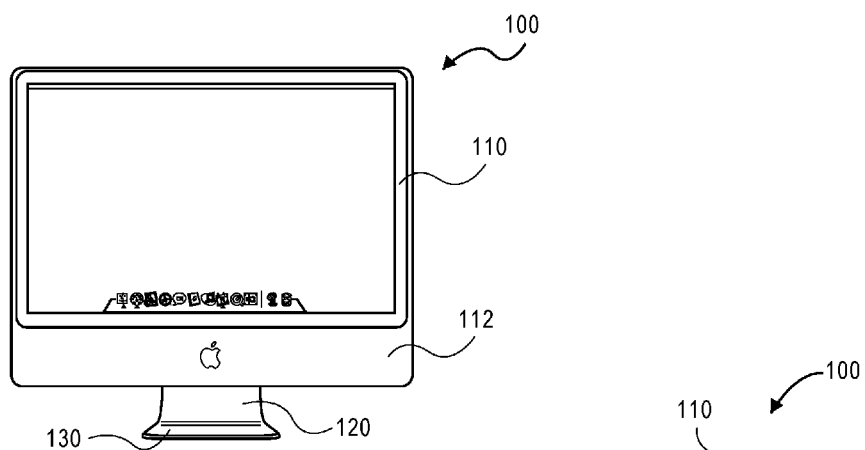
FIGS. 4A-4C, collectively referred to as FIG. 4, are images of an iMac® computer.
Figure 4B:
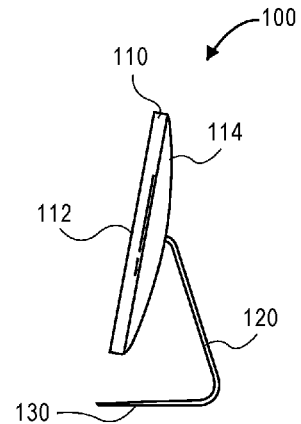
Figure 4C:
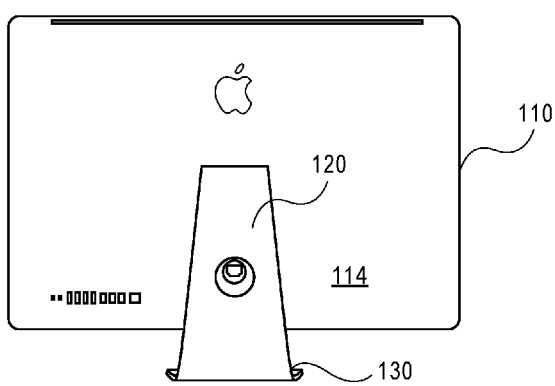

FIG. 3 show photographs of a prototype securing apparatus and parts thereof specifically constructed for securing a particular commercially available model of iMac® computer shown in FIG. 4. To provide some background, FIG. 4 depicts the iMac® computer 100 as comprising an all-in-one electronic component 110 capable of web-access that includes an output device in the form of a high-resolution LED-backlit display screen and input devices such as a camera. The electronic component includes a front surface 112 and a back panel 114. Attached to the back panel 114 is a unitary stand that comprises a neck 120 and a base 130. Unlike the neck shown in FIG. 2, the iMac® computer neck 120 is angled in a forwardly leaning manner.

Like the apparatus of FIG. 1, the securing apparatus of FIG. 3 also includes a collar, 10 connected via a connector 20 to a mounting bracket 30. However, the collar 10 shown in FIG. 3 is specifically sized and shaped for securing the neck of the iMac® computer. As such, when securely wrapped around the neck of the computer, the collar may be rendered substantially immobile relative to the computer.

As shown, the collar 10 may comprise rigid pincer-like clasps 11A and 11B joined by a hinge 11C that allows for relative pivoting motion between the clasps 11A and 11B. When the collar is in a closed configuration, the hinge 11C forms a corner of the collar. The interior surface 12B of the collar clasps are lined with a deformable material, e.g., a polymeric foam or sponge material, to guard against the clasps marking or scratching the neck 120. The deformable material may be placed on other surfaces of the collar as well. As shown, loops 18A and 18B, protrude from the exterior surface 12A of the collar at the ends 14A and 14B of the cuff sections 11A and 11B, respectively. The loops 18A and 18B, collectively referred to as collar loop 18, have identical or similar construction.

The prototype apparatus 1 also includes a telescoping connector 20 that includes distal segment 22A nesting partially or fully within middle segment 22B which in turn nests partially or fully within proximal segment 22C. The nesting segments 22A, 22B and 22C collectively form a connector body 22. Loop 28 of identical or similar dimensions to collar loop 18 is depicted as protruding from segment 22A.

A mounting bracket 30 is provided comprising a flat plate having opposing planar surfaces 32A and 32B that are substantially parallel to each other. A plurality of holes extends through the plate 30. The bracket is attached via a hinge bearing 34 to proximal segment 22C of the connector 20. As shown in FIGS. 3A, 3C, and 3D, the bracket 30 has a range or rotation about the hinge bearing 34 of up to about 270°.

FIG. 5 depicts in schematic cross-sectional view alternative electronic equipment setups that use the securing apparatus of FIG. 3 to secure the computer of FIG. 4. In FIG. 5A, for example, a support structure may be provided, e.g., comprising a platform in the shape of a rectangular block. The platform 200 is shown having a substantially planar and horizontal surface 202 on which the electronic equipment 100 may be placed. Also as shown, the platform additionally includes front and rear surfaces, indicated at 204 and 206, respectively. The computer 100 is placed on a support structure 200 such that its front surface 112 faces toward the front platform surface 204 and faces away from the rear support surface 206.

Figure 5A:
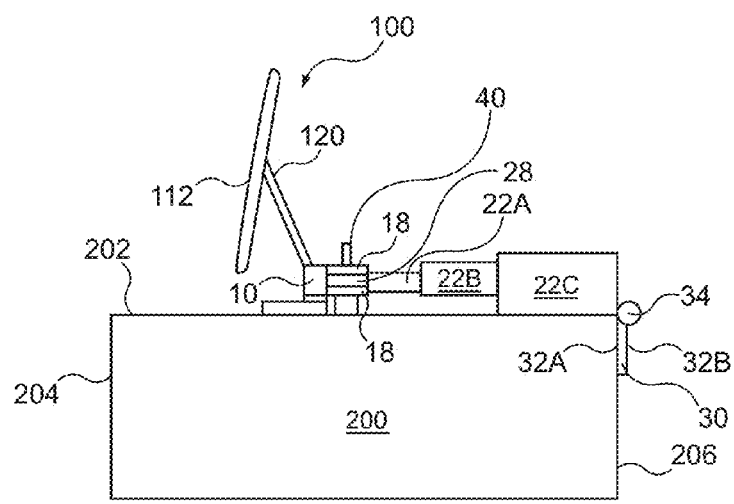
FIGS. 5A-5D, collectively referred to as FIG. 5, depict in schematic cross-sectional view alternative electronic equipment setups that use the securing apparatus of FIG. 3 to secure the computer of FIG. 4.

The apparatus 1 may then be used to secure the electronic equipment 100 to the support structure 200. As shown in FIG. 5A, hinge bearing 34 may be placed in an overhanging manner relative to a rear edge of the platform's horizontal surface 202. Under gravitational forces, the mounting bracket 30 hangs downwardly from the bearing 34 with surface 32A of the mounting bracket 30 facing the rear surface 206 of the platform 200. The mounting bracket 30 may then be screwed, bolted, or otherwise permanently affixed to the platform's rear surface 206.

To secure the computer 100, the collar 10 may be wrapped about the display's neck 120 with collar loops 18 protruding away from the computer 100 toward the rear surface 206 of the platform 200. Once the collar is in place, collar loops 18 may be aligned with hitch loop 28. A lock 40, such as a padlock, is then used to lock together collar loop 16 with the hitch loop 28. As a result, the computer 100 is secured to the support structure 200.

Figure 5B:
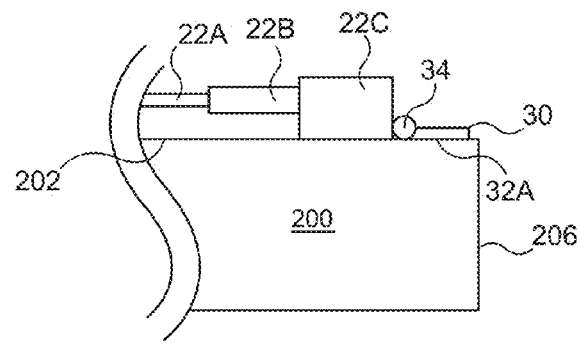
Figure 5C:
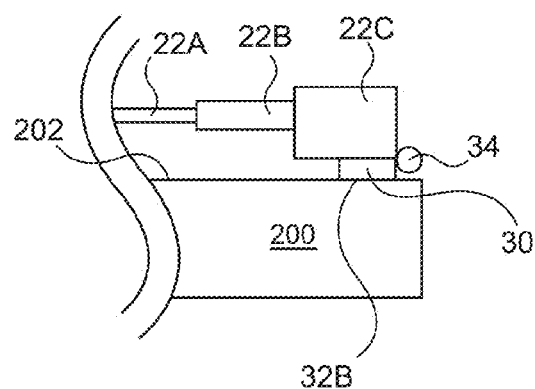
Figure 5D:
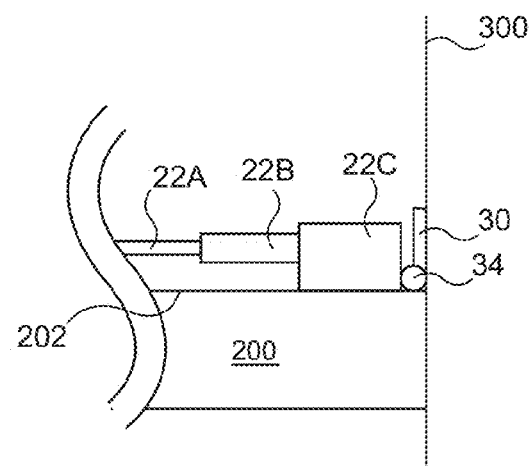

FIGS. 5B-5C depict alternative ways in which the inventive apparatus shown in FIG. 3 may be used to secure an iMac® computer to support structures. In both FIGS. 5B and 5C, the mounting bracket is permanently affixed to the platform's horizontal surface 202. However, the mounting configurations shown in FIGS. 5B and 5C differ in that the configuration of FIG. 5B results in surface 32A of the mounting bracket facing downward whereas the configuration of FIG. 5C results in surface 32A facing upward. In FIG. 5D, the platform 200 is positioned such that its rear surface 206 abuts an adjacent vertical wall 300. In such a case, the mounting bracket 30 may be permanently affixed to the wall 300, leaving the computer secured even if the platform, other support structure, or components thereof, are stolen. Other wall mounting options may be provided as well.

Figure 6A:
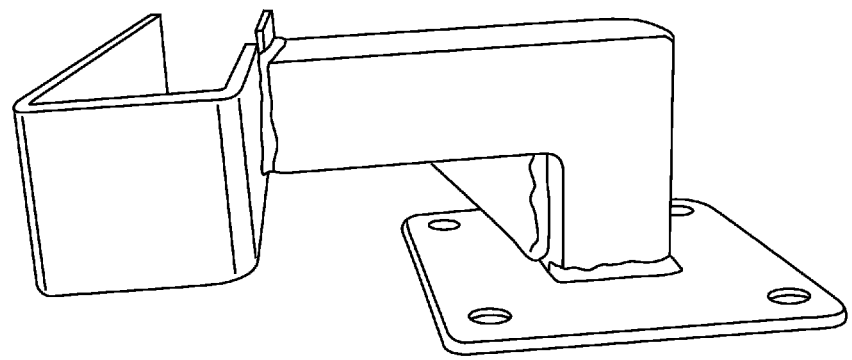
FIGS. 6A and 6B, collectively referred to as FIG. 6, depict alternative embodiments of the invention.
Figure 6B:
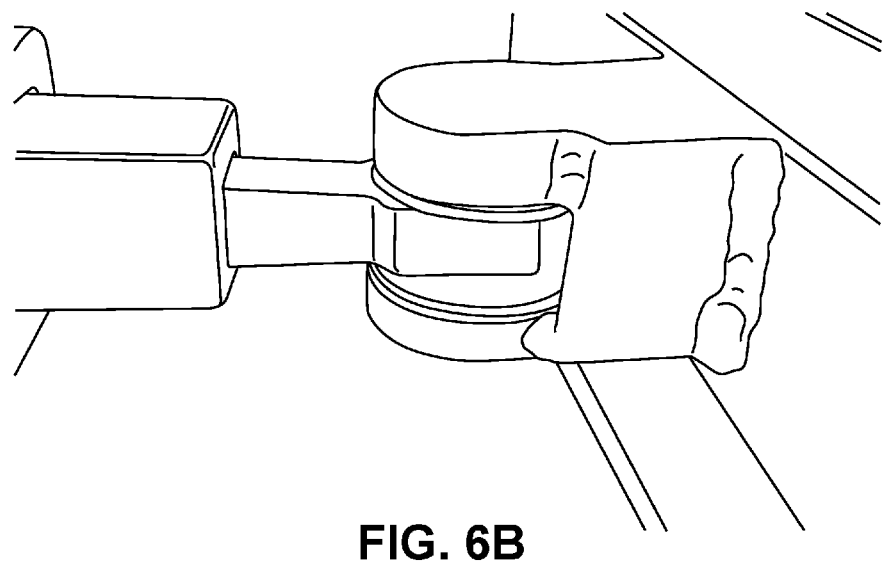

Variations of the present invention will be apparent to those of ordinary skill in the art in view of the disclosure contained herein. For example, while the inventive apparatus has generally been described as having a telescoping connector having nesting segments, e.g., as shown in FIGS. 1, 2, 3, 5, 6B and 7, telescoping connectors are not necessarily required for all embodiments of the invention. Connectors of a fixed length, as shown in FIG. 6A, may be employed in some instances. Also shown in FIG. 6, other top mounting options are possible as well. Back mounting options are also possible. For example, back mounting options may allow the inventive apparatus to be mounted to a back vertical surface of a support structure or to a side vertical surface of the support structure.

Figure 7:
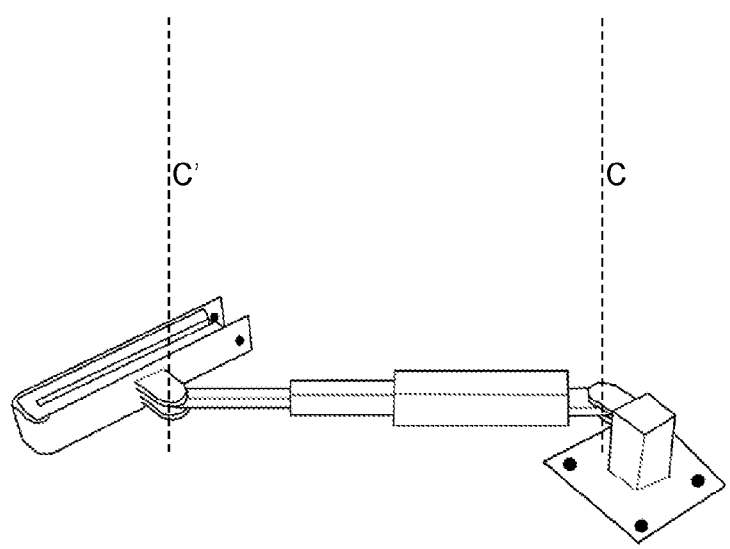
FIG. 7 schematically depicts an exemplary securing apparatus of the invention as a top-mounted, telescoping, dual swiveling unit.
Figure 9:
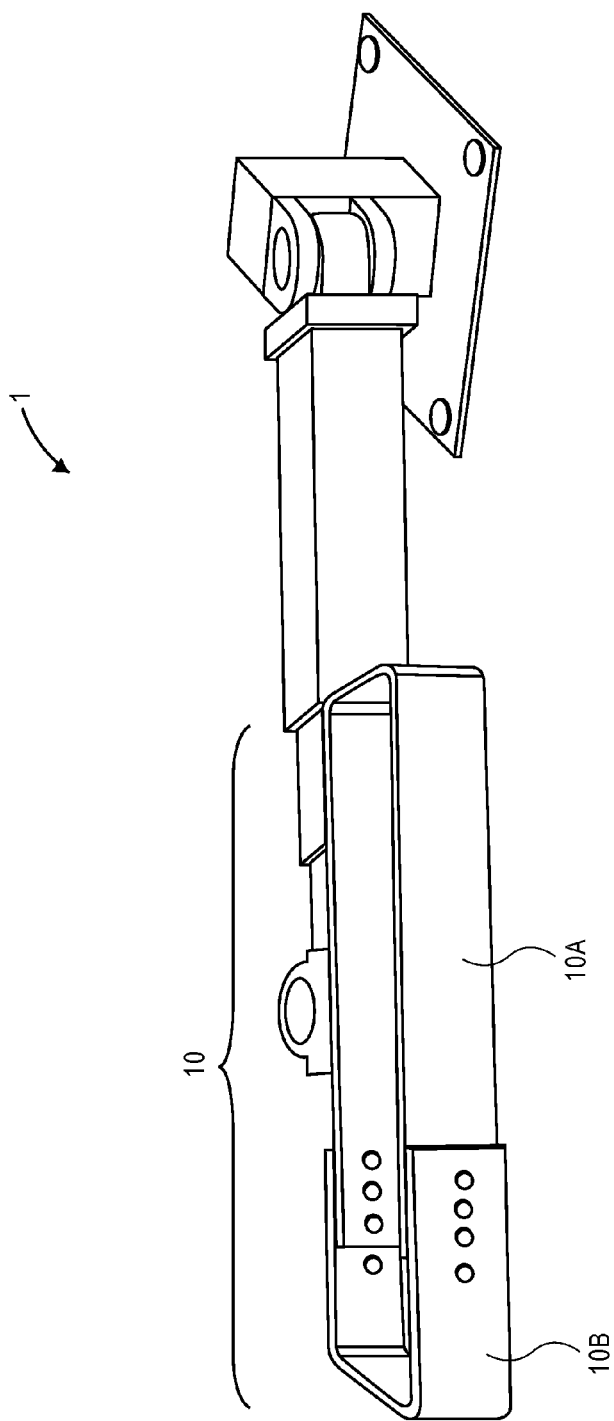
FIG. 9 schematically depicts the securing apparatus of FIG. 8 except in an assembled closed collar configuration.

As discuss above, the inventive apparatus may allow for swiveling action. For example, FIG. 7 shows a dual-swiveling unit, wherein the connector may swivel about an axis C perpendicular to the surface on which the unit is mounted. Similarly, the collar is also attached to the connector in a manner that allows the collar to swivel about a vertical axis C'. FIG. 9 shows a dual-swiveling unit as well.

Figure 8:
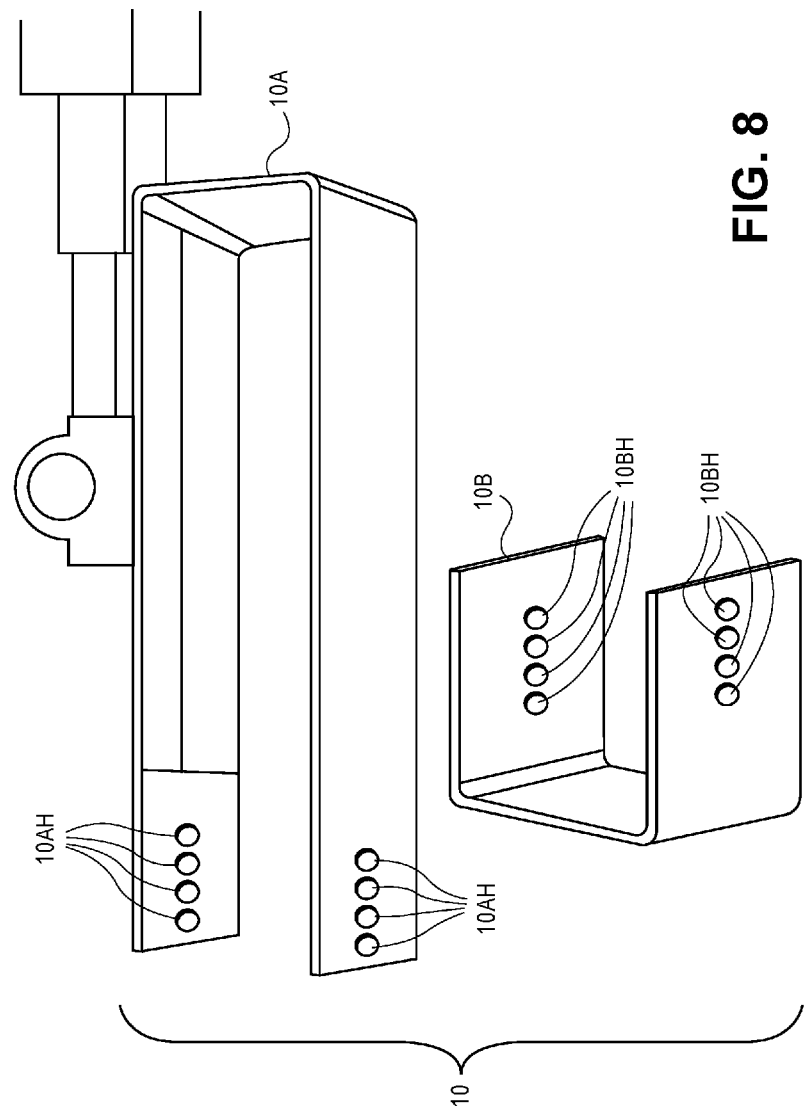
FIG. 8 schematically depicts an adjustable collar in a disassembled open collar configuration for a securing apparatus of the invention.

In addition, collars of the invention may be adjustable in shape and size. In some instances, as shown in FIGS. 1 and 2, the collars may be formed from a pliable material. Alternatively, all or a portion of the collars of the invention may be substantially rigid. For example, FIG. 8 schematically depicts a portion of an exemplary securing apparatus 1 of the invention having an adjustable collar 10 in an open and disassembled configuration. As shown, the collar includes an attached section 10A and an unattached (detachable) section 10B, both of substantial rigidity. Both collar sections are generally U-shaped and terminate in parallel prongs. Circular holes 10AH extend perpendicularly from the ends of the prongs of the attached collar section, and corresponding circular holes 10BH are present along the ends of the prongs of detached section.

FIG. 9 schematically depicts the securing apparatus 1 that includes the collar 10 of FIG. 8 except in a closed and assembled collar configuration. As shown, ends of the attached and detached sections are placed in overlapping relationship such that at least some holes from each prong of the attached collar section are aligned with corresponding circular holes of the detachable section so as to allow a lock to affix the detachable section in place. By increasing or decreasing the number of overlapping holes, the overall inner circumference of the collar may be rendered smaller or larger, respectively.

Alternative adjustable collar constructions may be used as well. For example, a collar may have multiple slots to accommodate a T-bar, which may be locked in place. Modified hitch locks and other variations may be used as well.

Furthermore, a means may be provided for managing wire extending from the electronic equipment. Such means may be attached to the connector. Exemplary wire managing means include hook and loop strips, sleeves, clips, covers, etc. Further still, the invention is not limited to embodiments depicted in the drawings. The invention may be used with an electronic component having a neck that is attached thereto at a location other than the component's back panel.

Any of the inventive units may have different finishes. For example, powder coated surfaces may represent a popular option for metallic units. Alternatively, raw metallic finishes may be used as well.

Other variations of the invention may be discovered upon engaging in routine experimentation during the ordinary course of the practice of the invention.

It is to be understood that, while the invention has been described in conjunction with the preferred specific embodiments thereof, the foregoing description merely illustrates and does not limit the scope of the invention. Numerous alternatives and equivalents exist which do not depart from the invention set forth above. In general, any particular embodiment of the invention may be modified to include or exclude features of other embodiments. Other aspects, advantages, and modifications within the scope of the invention will be apparent to those skilled in the art to which the invention pertains.

All patents mentioned herein are hereby incorporated by reference in their entireties to an extent not inconsistent with the disclosure provided above.

What is claimed is:

1. An electronic equipment setup, comprising:
   a support structure having a substantially horizontal surface;
   electronic equipment having an electronic component attached to a narrow neck extending from a base located on the substantially horizontal surface of the support structure; and
   a securing apparatus comprising
      an adjustable and rigidly pronged collar fastened around the neck of the electronic equipment,
      a mounting bracket attached to the support structure, and
      a connector attached to the collar and to the mounting bracket, the connector having a surface that substantially conforms to the horizontal surface of the support structure,
   wherein the collar of the securing apparatus, when in a closed configuration, is adjusted to fit to the neck of the electronic equipment such that the collar has a substantially smaller circumference than the electronic component of the electronic equipment, thereby preventing the collar from being slid off the electronic equipment.

2. The setup of claim 1, wherein a section of the collar is detachable from the connector.

3. The setup of claim 2, wherein the detachable section of the collar, in a closed configuration, overlaps a section of the collar that is not detachable from the collar.

4. The setup of claim 2, wherein the detachable section of the collar is substantially rigid.

5. The setup of claim 1, further comprising a lock.

6. The setup of claim 1, wherein the connector is attached to the mounting bracket in a manner that allows swiveling of the connector about an axis perpendicular to the horizontal surface of the support structure.

7. The setup of claim 1, wherein the electronic component comprises an output device.

8. The setup of claim 7, wherein the output device comprises a display screen.

9. The setup of claim 7, wherein the output device further comprises an input device or interfaces with an input device.

10. The setup of claim 7, wherein the electronic component is capable of internet access.

11. The setup of claim 1, wherein the neck and base represent portions of a unitary component of the electronic equipment.

12. The setup of claim 1, wherein the collar has an adjustable inner circumference, the neck has an outer circumference, and the inner circumference of the collar is adjusted to equal or exceed the outer circumference of the neck by no more than about 20%.

13. The setup of claim 1, wherein the mounting bracket is not attached directly to the substantially horizontal surface of the support structure.

14. The setup of claim 1, wherein the mounting bracket is attached to a substantially vertical surface of the support structure.

15. The setup of claim 1, wherein the output device faces away from the securing apparatus.

16. The setup of claim 1, wherein the connector is a telescoping connector.

17. The setup of claim 1, wherein the connector is attached to the mounting bracket by a swiveling component that provides swivel action between the connector and the mounting bracket, thereby allowing the connector to swivel about an axis perpendicular to the horizontal surface.

18. The setup of claim 1, wherein the collar comprises a section of a rigid construction that is not detachable from the connector.

19. An electronic equipment setup, comprising:
- a support structure having a substantially horizontal surface;
- electronic equipment having an electronic component attached to a narrow neck extending from a base located on the substantially horizontal surface of the support structure; and
- a securing apparatus comprising
  - an adjustably pronged collar fastened around the neck of the electronic equipment,
  - a mounting bracket attached to the support structure, and
  - a connector attached to the collar and to the mounting bracket, the connector having a surface that substantially conforms to the horizontal surface of the support structure,
- wherein the collar of the securing apparatus is fitted to the neck of the electronic equipment such that the collar has a substantially smaller circumference than the electronic component of the electronic equipment, thereby preventing the collar from being slid off the electronic equipment,
- further wherein the connector is attached to the mounting bracket by a swiveling component that provides swivel action between the connector and the mounting bracket, thereby allowing the connector to swivel about an axis perpendicular to the horizontal surface.

20. The setup of claim 19, wherein the collar comprises a section of a rigid construction that is not detachable from the connector.

* * * * *